June 21, 1966 — P. PATZ — 3,256,863
AUTOMATIC OSCILLATING BUNK FEEDER
Filed Oct. 25, 1961 — 4 Sheets-Sheet 4

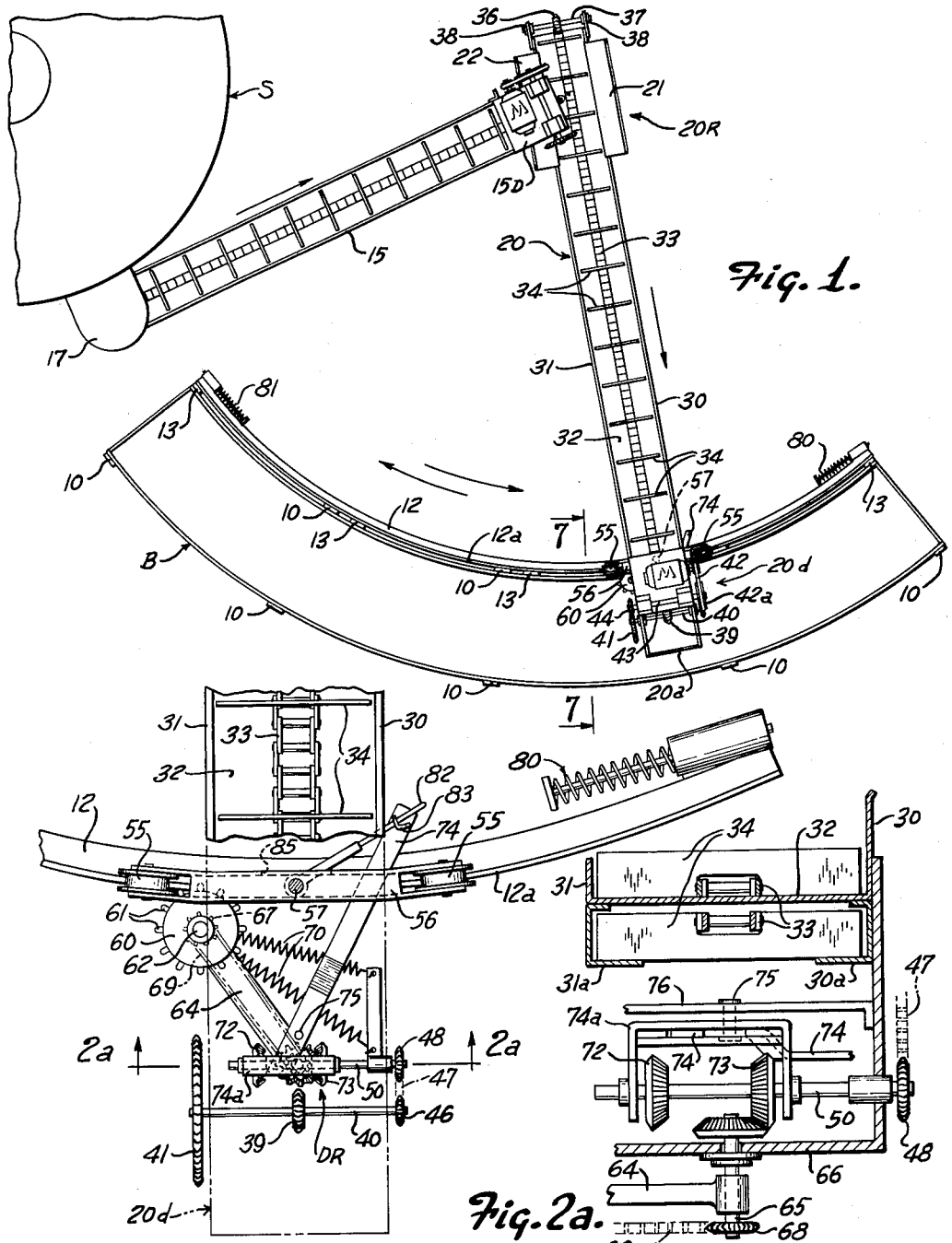

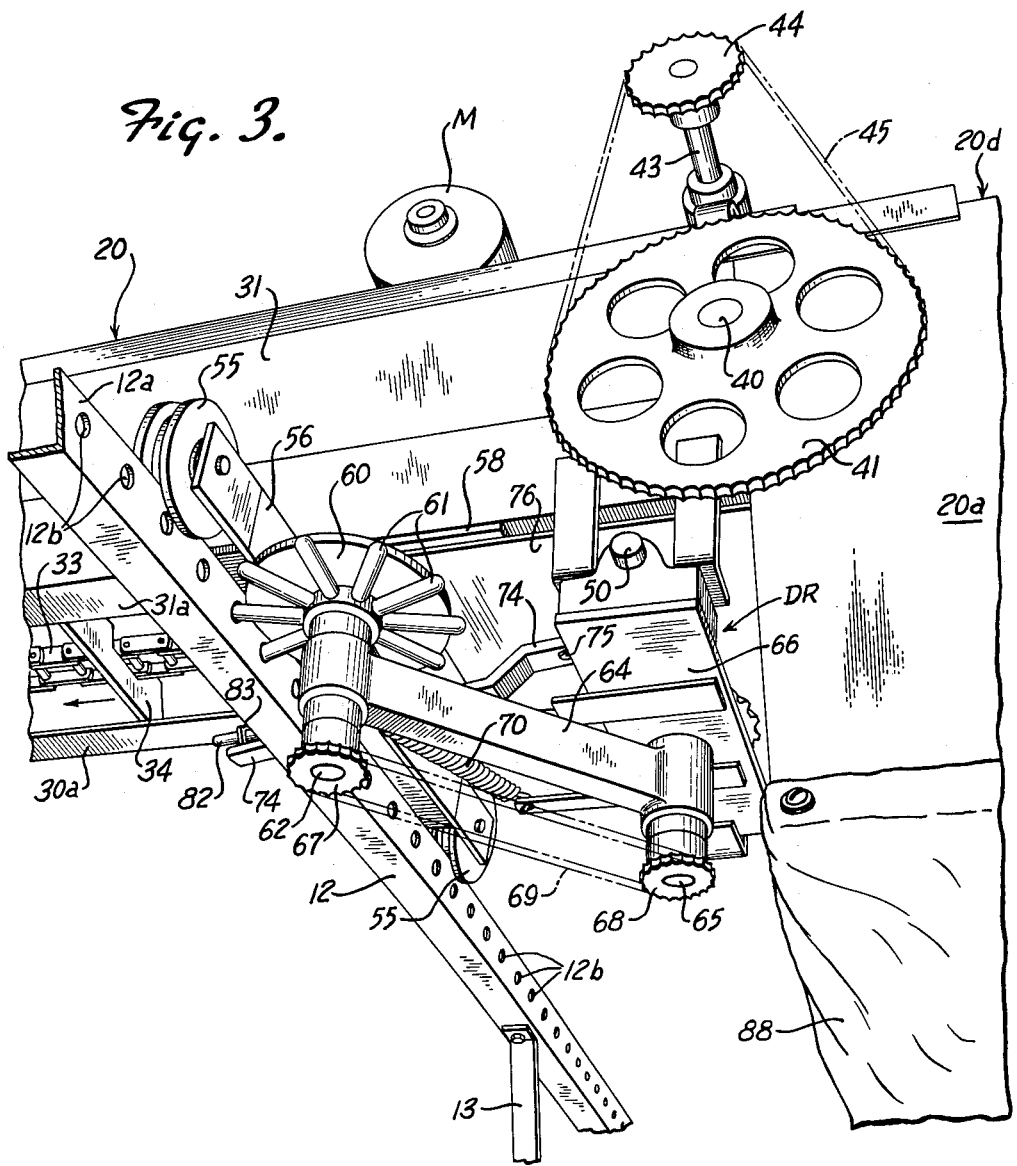

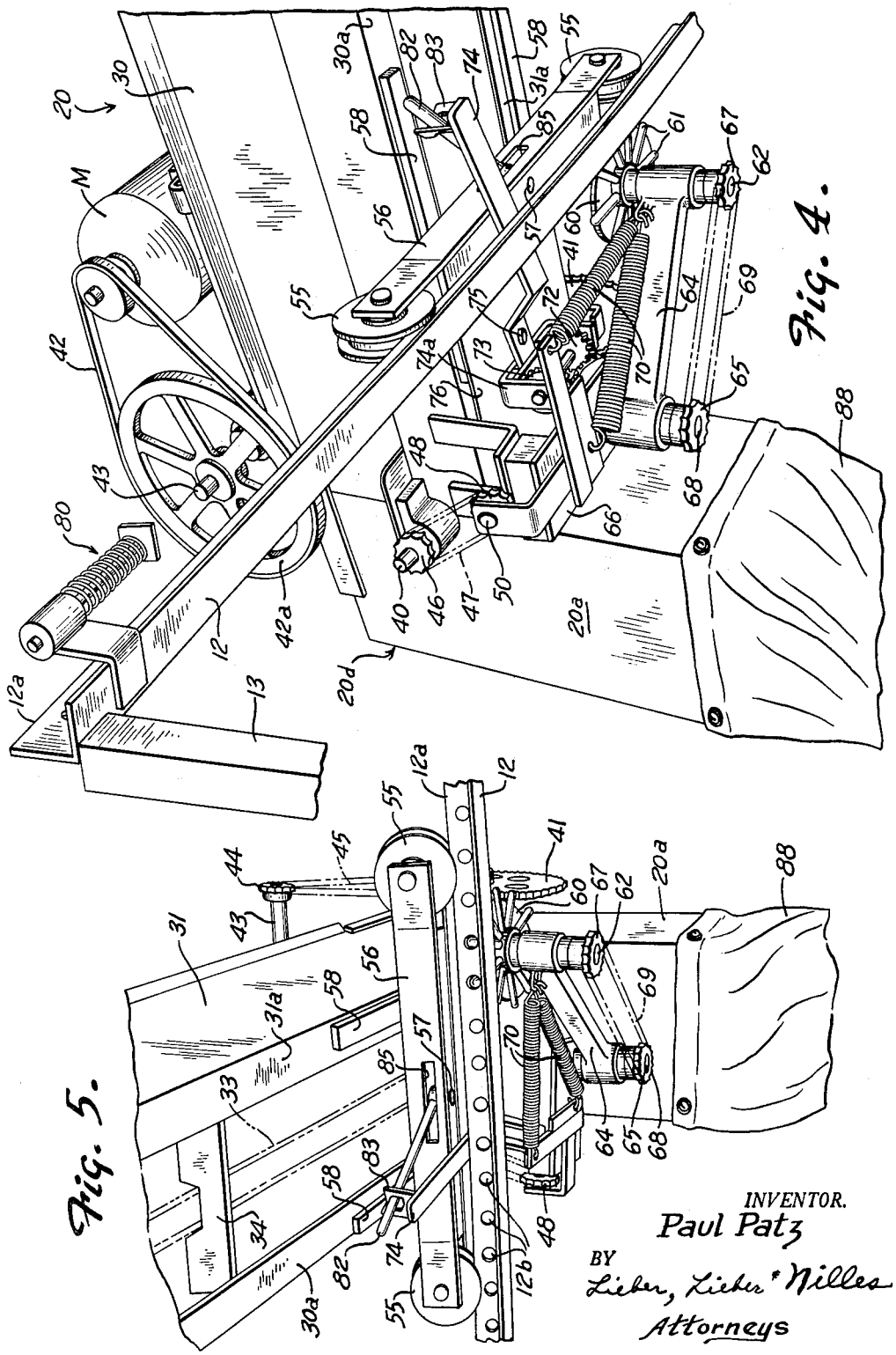

INVENTOR.
Paul Patz
BY Lieber, Lieber & Nilles
Attorneys

United States Patent Office 3,256,863
Patented June 21, 1966

3,256,863
AUTOMATIC OSCILLATING BUNK FEEDER
Paul Patz, Pound, Wis.
Filed Oct. 25, 1961, Ser. No. 147,496
1 Claim. (Cl. 119—52)

This invention relates generally to bunk feeders which convey ensilage or other material into an elongated trough or bunk from which the cattle feed.

Bunks of the type to which the present invention relates are often may feet in length and the cattle tend to crowd toward the area into which the feed is first introduced or in which the largest quantity of feed is placed. At feeding time, the cattle become restless and anxious to feed, and they push and crowd one another considerably in an attempt to get at the food.

It is therefore important to be able to spread the feed evenly and quickly throughout the length of the bunk in order that the cattle will quickly spread out along the length of the bunk and to insure that each animal gets its share of the feed.

Many prior art bunk feeders use an auger or other conveyor which extends along the length of the bunk and which feeds material from one end of the conveyor and deposits the material progressively along the length of the bunk. As a result, the starting end of the bunk fills up first, and the cattle immediately begin to empty that end of the bunk. As soon as the material is removed from that end by the cattle, it is replaced immediately with fresh material from the conveyor. Therefore, the cattle at one end of the bunk are overfed, while the cattle at the other end of the conveyor receive only the overflow feed material which is not dumped into the starting end of the conveyor.

In other words, these prior art bunk feeders are not entirely satisfactory because they must move all of the feed from and through one end of the feeder. This results in uneven placement of the feed along the length of the bunk. In addition, and importantly, continual moving of the entire load in the conveyor and along the bunk requires a considerable amount of power, resulting in a costly operation.

Still other disadvantages of continuous conveyors in the bunk are that (1) it is difficult to mix feed supplements, such as ground grains, evenly in the main diet and throughout the length of the bunk, and in fact it is impossible to distribute these supplements independently of the main diet, that is, lay it alongside or on top of the main diet, (2) the length of such a bunk is limited because of the horsepower requirements and also because of the number of bearings necessary for the conveyor sections, and (3) the obstruction formed by, and the hazard and injury to the cattle due to, the presence of the moving conveyor in the immediate area where the cattle are feeding.

Accordingly, the bunk feeding arrangement provided by the present invention eliminates the above-mentioned shortcomings and disadvantages of these prior art feeders.

The bunk feeder made in accordance with the present invention spreads the feed completely evenly and rapidly throughout the length of the bunk. More particularly, the feeding conveyor does not continually push all of the feed throughout the length of the bunk; instead, the conveyor is not located in the bunk but its discharge end moves relative to or over the entire length of the bunk and simultaneously discharges feed evenly and quickly along the entire bunk length. As a result, a conveyor may be used which need not be coextensive in length with the bunk length but can be much shorter, and also much less power is required to operate the improved feeder.

A further aspect of the invention provides a guide track along the length of the bunk and on which the swinging discharge end of the conveyor is mounted and guided. Driving means are provided between the conveyor discharge end and the track so that the conveyor can drive itself along the track at a speed selected for heavy or light feeding. Thus, the amount of feed can be regulated as well as insuring even feeding along the bunk length.

In addition, the drive arrangement is such that the conveyor will automatically reverse itself upon reaching the end of its travel in one direction, to thereby automatically begin another pass over the length of the bunk.

The invention furthermore lends itself to the separate feeding of feed supplements and evenly along the entire length of the bunk. Supplementary feeds can be placed all along the bunk and independently of the main feed, for example, they can be placed on and spread over the main feed already in the bunk. Alternatively, the supplements can be mixed with the main feed before either is delivered by the conveyor, and then the mixture can be evenly distributed along the bunk length.

Still another and important aspect of the improved bunk feeder is that the conveyor is not located in the bunk, thereby leaving the entire interior of the bunk unobstructed from complete access by the cattle from each side of the bunk. There is, furthermore, no danger to the cattle due to the proximity of the moving conveyor.

These and other objects and advantages of the present invention will appear later as this disclosure progresses, reference being had to the accompanying drawings, in which:

FIGURE 1 is a plan view of one form of feeding bunk utilizing a bunk feeder made in accordance with the present invention;

FIGURE 2 is a fragmentary plan view of a portion of the FIGURE 1 feeder, but on an enlarged scale, and showing the drive and reversing mechanism, certain parts being shown in section, broken away, or removed;

FIGURE 2a is a front fragmentary elevational view taken generally along the section line 2a—2a in FIGURE 2;

FIGURE 3 is an enlarged, fragmentary, perspective view of the outer or swinging end of the bunk feeder shown in FIGURES 1 and 2, the view being taken generally from below and to one side of that end;

FIGURE 4 is a view similar to FIGURE 3, but taken from the other side of that end;

FIGURE 5 is a view similar to FIGURES 3 and 4, but taken from beneath that end and generally centrally thereof;

Feed Bunk

Figure 6:
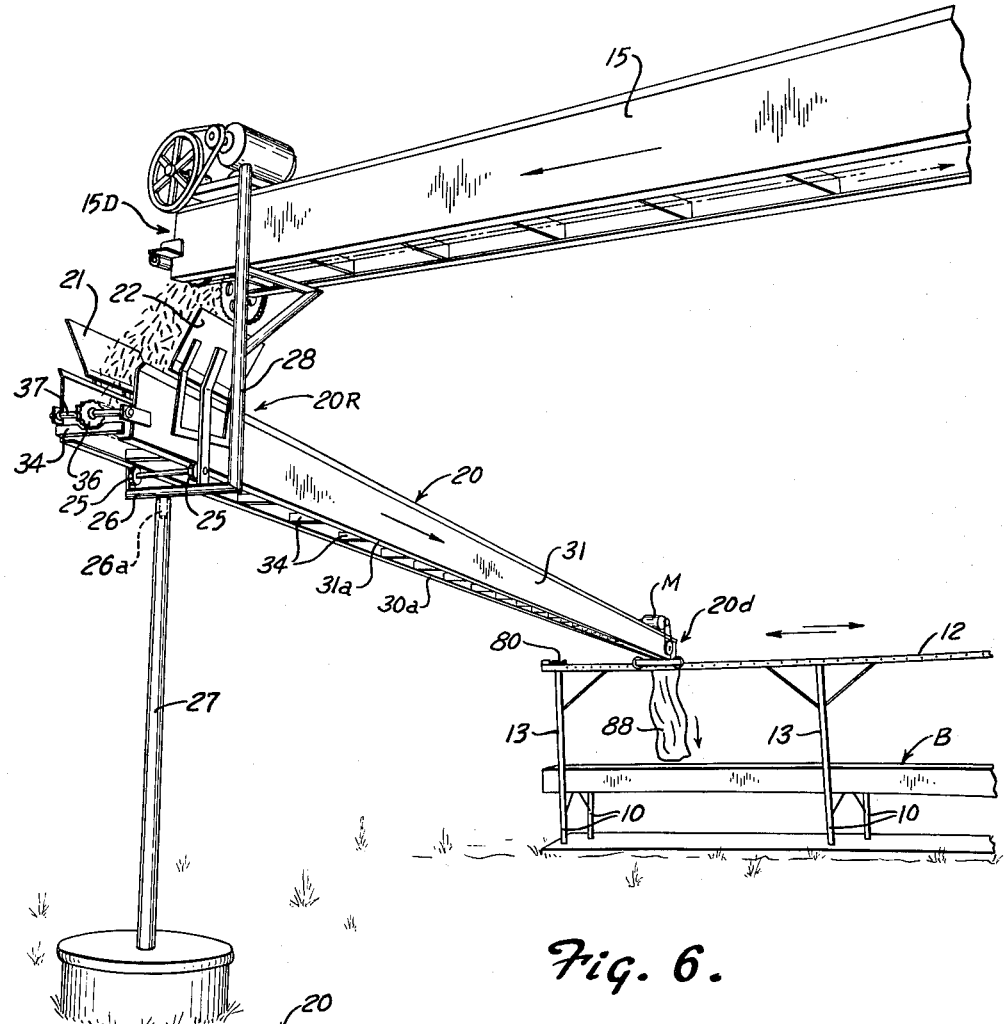
FIGURE 6 is a perspective view taken generally from the receiving end of the feeder conveyor and showing its connection with the preliminary conveyor.
Figure 7:
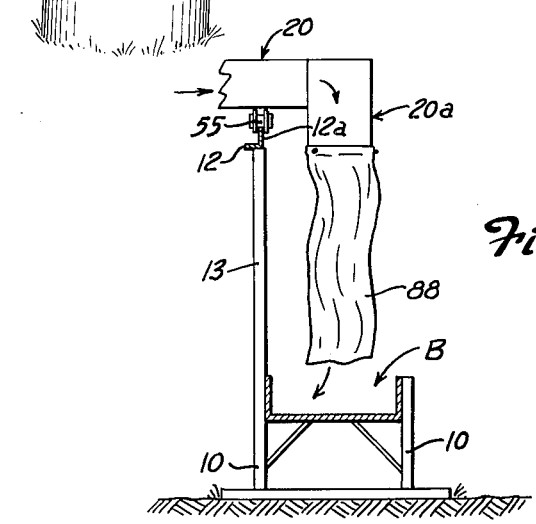
FIGURE 7 is a sectional, more or less schematic, side elevational view taken generally from the line 7—7 in FIGURE 1.

Referring in greater detail to the drawings, the feeding trough or bunk B may be curved or straight, and it often is many feet in length. The bunk shown here for illustrative purposes is arcuate shaped in plan view and is supported at a desired height from the ground by legs 10 spaced along its length. The bunk may be formed of suitable lengths of planking and is open and unobstructed along each side of its entire length in order that the cattle may feed from both sides and thereby make more efficient use of a given length of bunk. It should also be noted that the entire cross-sectional area of the bunk is completely open and unobstructed.

Guide rail

Along the length of the bunk and at one side thereof is provided a guide rail 12 that is rigidly held in an elevated position relative to the bunk by a series of vertical supports 13. This rail has a vertically positioned flange 12a which forms a guide track, as will appear and which has a series of equally spaced apertures 12b along its entire length. These apertures are complementary to the driving lugs or teeth of a drive wheel, also to be described. Thus, the guide rail is generally coextensive in length with the bunk and may be located at any convenient height relative thereto. The rail furnishes a support and guide for the free end of a swinging conveyor 20.

Means for loading the feeder

The arrangement shown in FIGURES 1 and 6 is simply for the purpose of illustrating one conveying and feeding set up for a particular installation, but other means for initially conveying the ensilage or other feed to the conveyor 20 may be utilized. Furthermore, other lengths or forms for the bunk when viewed in plan may be used, all in accordance with the present invention.

The FIGURES 1 and 6 installation includes a preliminary conveyor 15 which may be of any conventional type, such as, an endless raddle or apron. Conveyor 15 has its receiving end adjacent the silo S and receives ensilage which drops by gravity from the silo chute 17. Conveyor 15 is inclined so that its discharge end 15D is directly above the inner or receiving end of a swinging or shiftable conveyor 20. The discharge end 15D of the preliminary conveyor is located generally above the pivot point of the swinging conveyor 20 so that it feeds properly into conveyor 20 regardless of the position of the latter. Side shields 21, 22 carried by conveyor 20 prevent spilling of the feed as it falls by gravity into conveyor 20.

The inner or receiving end of conveyor 20 may be fed in different ways. For example, if the space or location requirements of the feeding yard were such, the receiving end of the conveyor 20 may be located adjacent the ground and directly under the silo chute for being fed directly thereby. In that arrangement, the conveyor 20 would be inclined upwardly toward its discharge end, and the need for a preliminary conveyor 15 may be eliminated.

Swingable conveyor

In any event, the entire conveyor 20 is capable of shifting longitudinally at it swings, in order to accommodate various forms or degrees of curves of the guide rail. This is accomplished by supporting the receiving end 20R of conveyor 20 on rollers 25 (FIG. 6) rotatably carried in a yoke 26 which in turn is rotatable by its vertical shaft 26a extending into the top of the vertical support post 27. The yoke thereby pivots in the support 27, and the conveyor 20 is free to swing about support 27 as a pivot and is also free to shift longitudinally on rollers 25.

The support for the discharge delivery end 15D of the preliminary conveyor is provided by an extension 28 of the yoke 26 which insures that the discharge end is located above the pivot point for conveyor 20.

The conveyor 20 has side walls 30 and 31 which together with the bottom wall 32 form a trough. The upper flight of an endless chain 33 travels directly on and over the bottom wall 32, while the transverse flights 34 secured at spaced locations to the chain act to propel the feed along the trough in the known manner from the receiving end 20R to the discharge end 20d. Side walls 30 and 31 have inwardly turned flanges 30a and 31a along their lower edge, on which flanges the flights slide during their return travel, and thereby support the lower flight of the chain.

The endless chain 33 at the receiving end of conveyor 20 (FIG. 6) is trained over a sprocket 36 fixed on a shaft 37 journaled in suitable bearings 38 in the walls of the conveyor.

At the discharge end of conveyor 20, this endless chain is trained over a sprocket 39 (FIG. 1) fixed to the driven shaft 40, which shaft is also suitably journaled in the side walls of the conveyor. On one end of shaft 40 is fixed the large sprocket 41 (FIG. 3) which receives its rotative force from the electric motor M through the motor drive belt 42, pulley 42a (FIG. 4) layshaft 43, sprocket 44, and chain 45.

The conveyor 20 has a downwardly extending hood 20a secured at its outer end and which is in communication with the discharge end of the endless chain so that material discharged by the chain drops into the hood and falls by gravity therefrom.

The other end of shaft 40 has a smaller sprocket 46 (FIG. 4) fixed thereto, and a chain 47 trained around it and around another sprocket 48 fixed to a shaft 50 of the drive and reversing mechanism DR for propelling the conveyor 20 along its guide rail 12, as will appear more fully hereinafter.

The swinging or discharge end 20d of the conveyor is mounted on the guide rail and guided for movement therealong by a trolley carriage comprised of a pair of guide wheels 55 journaled on opposite ends of a beam 56. The beam is pivotally mounted intermediate its length on a downwardly extending stub shaft 57 (FIGS. 2 and 5) secured to the underside of the conveyor. Reinforcing bars 58 are welded along the underside of the conveyor so that the latter can rest directly on top of the beam 56 and its considerable weight firmly supported by the carriage. The periphery of the wheels 55 are annularly grooved so as to fit over the upper edge of the flange 12a of the guide rail and thereby positively follow the guide rail as the conveyor is propelled in either direction.

The pivotal mounting for the carriage permits it to rotate slightly relative to the conveyor so that it may adapt itself to the various degrees of curvature of the guide rail and as the conveyor may slightly shift longitudinally as it travels over the guide rail.

Drive and reversing mechanism

The drive and reversing mechanism for swinging the conveyor includes a toothed drive wheel 60 having a series of radial teeth 61 extending from around its periphery and which wheel is journaled about its vertical shaft 62 in the free end of an arm 64. Arm 64 is mounted at its other end on a vertically depending shaft 65 journaled in the conveyor frame 66. Sprockets 67 and 68 fixed to the lower ends of shafts 62 and 65, respectively, are drivingly connected together by the endless roller chain 69.

The spacing of the teeth 61 permits their registration with the holes 12b in flange 12a of the rail. The drive wheel is biased tightly into engagement with the rail by spring means 70 acting between the arm 64 and the conveyor frame 66.

As the drive wheel is positively driven in either direction, it drives along the rail to propel the conveyor in a corresponding direction therealong.

Other drive means may, of course, be provided between the conveyor and rail 12; for example, the wheels 55 could be positively driven to thereby propel the conveyor, and it is not intended to limit the present invention to any particular form of drive.

The horizontally disposed shaft 50 has a pair of oppositely facing bevel gears 72, 73 (FIG. 2a) slidably splined thereon which are simultaneously shifted in either direction on shaft 50 by the shifting arm 74 pivoted intermediate its length at 75 to the conveyor frame 76, and which arm has a shifting yoke 74a engaging the bevel gears.

The arm 74 is shifted automatically whenever the conveyor reaches the end of its swinging travel in either direction, thereby causing the opposite bevel gear to be engaged and drive mechanism reversed. The conveyor then immediately begins travel in the opposite direction. The means for causing this reversal by shifting arm 74 takes the form of a resilient stop 80 mounted adjacent one end of the guide rail, and a similar but oppositely facing stop 81 mounted adjacent the opposite end of the rail. These stops are located so as to be engaged by an intermediate lever 82 (FIG. 5) which is also pivotally mounted at one end on the carriage shaft 57 and which extends through a bracket 83 secured on the end of arm 74. Thus, the lever 82 acts to shift the arm 74 as the conveyor approaches the end of its travel, and thereby swing the arm to its opposite position to cause reversal of the drive as previously mentioned. The arm 74 is limited in the amount it is swung by the limited movement permitted of lever 82 in the slot 85 of the carriage.

As the discharge end of the conveyor is located a distance above the bunk, a flexible tube 88 may, if desired, be attached to the end of the conveyor so as to direct the discharged material more precisely into the bunk, as for example, when a strong wind is blowing. This tube may be made of any suitable material, such as, cloth or plastic, and cannot injure the cattle while they are feeding, nor does it even disturb them as it passes by.

*Recapitulation*

The feed may be delivered to the receiving end of the swingable conveyor in any suitable manner. The bunk may be of varying curvature and has a guide track along its length. This track guides the free end of the conveyor and also cooperates with the drive mechanism in causing the conveyor to be propelled in either direction and also be automatically reversed in its direction of travel.

By means of the present invention, it is possible to use a conveyor having a shorter length than the bunk length, and it is unnecessary to push all of the feed through the entire trough in order to fill the entire trough length. A considerable reduction in power requirement is therefore effected by the present invention. Furthermore, the feed is evenly and quickly distributed along the entire length of the bunk. Feed supplements can be deposited evenly along the entire bunk together with the main feed diet or they can be placed separately and evenly along the length of the bunk.

A particularly efficient feeder which can be easily regulated as to feed rate has been provided by this invention.

Various modes of carrying out the invention are contemplated as being within the scope of the following claim particularly pointing out and distinctly claiming the subject matter which is regarded as the invention.

I claim:

A bunk feeder mechanism for cattle comprising, an elongated arcuate bunk which is unobstructed along each side to permit cattle to have access thereto, a generally arcuate guide rail adjacent and above said bunk and generally coextensive in length therewith, said rail fabricated from an angle iron and having an upwardly extending flange, a trolley carriage having wheels, said wheels each having a peripheral groove which engages said upstanding flange for guiding the trolley along said rail, an elongated feed conveyor arranged generally transversely to said bunk and having a feed discharge end supported by said carriage and a receiving end mounted at substantially the center of curvature of said rail for swinging movement of said conveyor generally horizontally along said bunk; said discharge end being located above said bunk whereby feed is discharged by said conveyor into and along the length of said bunk; and propelling means on said carriage for engaging said arcuate rail whereby said conveyor is guided and driven along said rail.

References Cited by the Examiner

UNITED STATES PATENTS

| | | | |
|---|---|---|---|
| 1,044,547 | 11/1912 | Liggett | 198—100 |
| 1,169,948 | 2/1916 | Freeman | 198—86 |
| 1,222,219 | 4/1917 | Lafont | 198—125 X |
| 1,462,078 | 7/1923 | Williams et al. | 198—31.3 X |
| 1,487,001 | 3/1924 | Williams | 198—31.3 |
| 2,735,400 | 2/1956 | Stubbs | 119—52 X |
| 2,914,023 | 11/1959 | Pierre | 119—52 |

CARL W. ROBINSON, ARNOLD RUEGG, *Examiners.*

JOE O. BOLT, JR., *Assistant Examiner.*

ABRAHAM G. STONE, *Primary Examiner.*